March 13, 1951 K. E. APPERT 2,545,250

FREQUENCY CHANGING CIRCUIT

Filed Dec. 15, 1949

INVENTOR.
KURT E. APPERT
BY Lippincott & Smith
ATTORNEYS

Patented Mar. 13, 1951 2,545,250

UNITED STATES PATENT OFFICE 2,545,250

FREQUENCY CHANGING CIRCUIT

Kurt E. Appert, San Francisco, Calif., assignor to Lenkurt Electric Co., Inc., San Carlos, Calif., a corporation of Delaware Application December 15, 1949, Serial No. 133,105

1 Claim. (Cl. 332—47)

Figure 1:
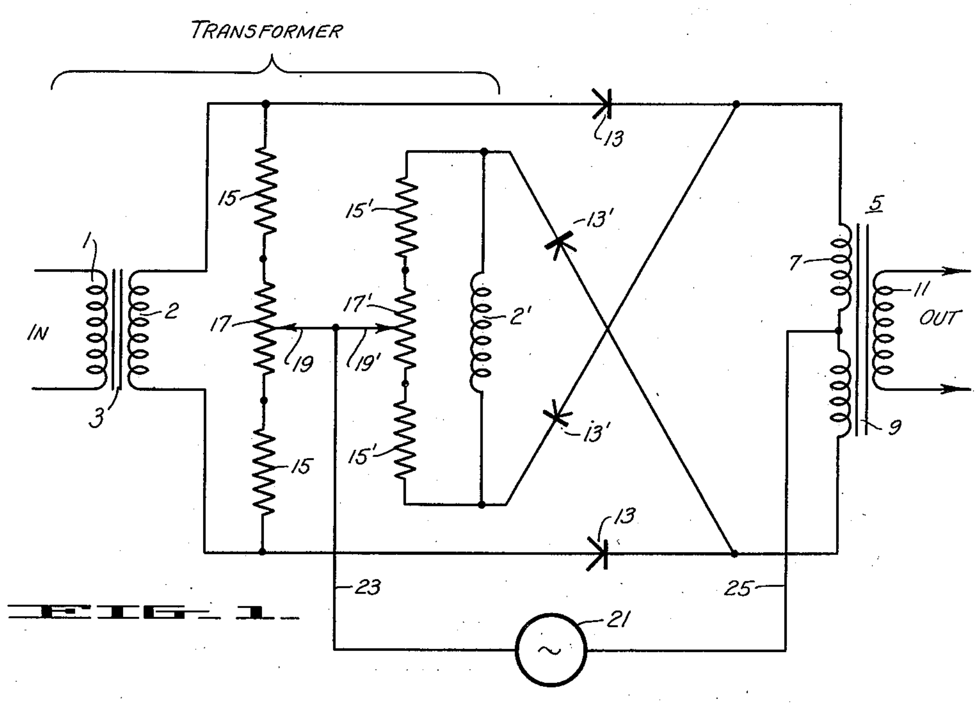

This invention relates to frequency changing circuits, that is, circuits for modulating or demodulating carrier waves for radio or carrier current telegraph or telephone use, and particularly to such circuits of the "double balanced" type which exclude from the output both of the frequencies which are fed into the device and leave, in such output, only the sum or difference frequencies thereof.

The class of modulator-demodulator circuits here under consideration is that which accomplishes the modulating function by what is essentially a reversing switch process wherein the output frequency which is to be modulated upon a carrier or demodulated from a carrier sideband is reversed at the carrier frequency, the reversal being accomplished by the non-linear current-voltage characteristic of a group of rectifiers. A large number of circuits using this principle are known and some of them are widely used. Practically any type of non-linear circuit element may be employed for the purpose, including thermionic tubes as well as rectifiers of the contact type. The latter, however, are at the present time more important commercially, owing to the fact that if they are not overloaded they require practically no maintenance over long periods of time, and that no power supply for cathode heating or anode bias is required.

In circuits of the character mentioned the switching is accomplished by applying to the rectifiers the carrier frequency at a potential which is in excess, and preferably materially in excess, of the other input voltage, whether the latter be a low modulating frequency or a sideband frequency; for convenience it will hereinafter be referred to as the modulating frequency regardless of whether the process involved is modulation or demodulation. In frequency changing circuits of the balanced type two pairs of rectifiers are used, and the circuits are so arranged that the carrier potential is applied to one pair in the "forward" or current-carrying direction, and to the other pair in the reverse direction, wherein the resistance offered by the rectifiers is so high that the current carried is negligible. The other input potential is applied in opposite polarities to the two rectifiers of each pair. Accordingly, by the principle of superposition, one of these rectifiers carries a current which is the sum of the instantaneous values of the carrier and the modulating current whereas the other rectifier of the current-carrying pair carries a current which is the difference of the two. Since the applied carrier voltage is the higher the net current through both of the current-carrying rectifiers is in the forward direction. On the other hand, one of the second pair of rectifiers is subjected to the sum and the other to the difference of the instantaneous carrier and modulating potentials: the resultant must always be of the same sign as the carrier or conduction will occur and the switching system break down with consequent distortion.

When the rectifiers are in the current-carrying state their effective resistance is quite low. Voltage drops occur around both input circuits. Since, in the carrier circuit, the primary function of the carrier voltage is to maintain the rectifying switches in the "open" or "closed" position, respectively, in the simpler forms of such circuits the carrier voltage drop occurs primarily across the rectifying units. As the two pairs of rectifiers are connected in parallel as viewed from the carrier current source, the potentials which serve to hold one pair of rectifiers in the "open" state are limited to the drop across the "closed" rectifiers. In the signal circuits, on the other hand, only a small proportion of the voltage drop need occur across the rectifiers. As a result of these factors, and because it is a necessary condition in this type of modulator circuit that the carrier voltage exceed the signal voltage, the operation must be held to a very low level if distortion is to be avoided, for if it is not, the "closed" rectifiers will overload.

To avoid this situation current-limiting resistors have been introduced in series with the carrier circuit. Various circuits for doing this are known in European practice; in the United States one example of such circuits is the patent to E. S. Grimes, No. 2,462,093. The patent mentioned shows two arrangements for introducing such resistance, in one of which the current-limiting resistors are inserted in the individual arms of a substantially conventional bridge modulator circuit, and in the other of which limiting resistors form the arms of a T connection between the midpoints of two separate secondaries on the modulating current input transformer.

One of the functions of the double balanced modulator, and a primary reason why such modulators are used, is to exclude the carrier frequency itself from the output circuit, and the success with which this end is achieved depends almost entirely upon an accurate impedance balance as between the rectifying elements of each pair; or, at least, an accurate impedance balance as between the arms of the circuits that contain these rectifiers. Contact rectifiers of the types used for such duty are notoriously non-uniform, and the achievement of balance as between the rectifiers themselves depends very largely upon the careful selection from a relatively large number of samples of those to be used in any one modulator. The same thing holds true, though perhaps to a somewhat lesser degree, as regards electronic rectifiers of either the diode or the multi-electrode types. Moreover, even though rectifiers may have originally been selected which are in balance there is sometimes a drift in impedance as the devices age.

In circuits of the type wherein current-limiting resistors are connected in the rectifier arms of the circuit, as in the Grimes circuit first described, any lack of balance which may exist between the rectifiers in the conducting condition may be compensated by the resistors, since they may be made of high enough value so that the rectifier resistance becomes a small proportion of the impedance of the entire circuit. This arrangement, however, means that the modulated components themselves must traverse the high impedance paths, and the result is a very large insertion loss in the device as a whole. In the second type of circuit the insertion of the resistors has no effect upon the balance, but the insertion loss is not affected by their presence. Moreover, this latter type of circuit requires that a plurality of center tapped windings be balanced with extreme accuracy, and the complication and the expense of the circuit are multiplied with each new balance which must be attained. Since there are multiple balances required in circuits of this latter character, each of which is independent of the others, and any of which will upset the overall balance, while it may be possible to obtain a balance with respect to one branch it is almost impossible to achieve such balance with respect to all. All other circuits of the prior art with which I am familiar are subject to one or the other of these limitations and in the practical case both of the limitations are serious ones.

The broad purpose of the instant invention is to avoid the limitations just mentioned as inherent in the circuits of the prior art, and to provide, instead, a frequency changing circuit wherein modulation or demodulation may be attained at a high level without overloading the non-linear elements included therein; to provide a circuit wherein the carrier current component may be balanced out to as high a degree of accuracy as may be warranted by the duty to which the device is applied and to provide a circuit wherein accurate balance is required as between a minimum number of transformer windings and wherein failure to balance such windings may be compensated and is not fatal to achieving an overall balance of the carrier component and its exclusion from the external circuits.

In accordance with this invention a pair of conjugate transformers is provided, these transformers acting, respectively, as the input and output transformers for the modulating and modulated signals. One of these transformers, which, for convenience, may be referred to as the "input" transformer, is provided with two substantially equal but separate secondary windings. The other transformer, termed for convenience the "output" transformer, has a single secondary winding which is center-tapped. As in the case of all frequency changing circuits of the character herein referred to the functions of these two transformers may be interchanged without effect upon the operation of the device. Each of the separate secondaries is bridged by a pair of resistors in series, and the carrier potential is applied between the junction points of these resistors and the center tap of the output transformer. One end of the output transformer is provided with a pair of connections, these connections leading respectively to ends of the two separate secondary windings on the input transformer which are oppositely poled with respect to the primary winding. A similar pair of connections extends from the other end of the output winding to the opposite ends of the separate secondaries, and a non-linear element or rectifier is inserted in each of the four connections mentioned. The rectifiers connected to the two ends of each of the separate secondaries are oppositely poled with respect to the carrier potentials applied thereto.

As a result of this system of connections there is a separate resistor in series with each of the rectifying elements, and these resistors may readily be adjusted so as to balance out any inequalities in the carrier component. The resistors are not, however, in series with the rectifiers as viewed from either the input or the output transformers; instead, the four resistors in series-parallel are shunted across the signal circuit, offering a shunt impedance equivalent to the resistance of one of the four resistance elements, and since this can be made quite high the resulting insertion loss is relatively small. The carrier voltage may be applied either from a two-wire circuit one terminal of which connects to the midpoint of both pairs of bridging resistors, the other terminal connecting to the midpoint of the center-tapped transformer, or a three-wire connection can be used with the midpoints of the carrier and the output transformer connected together while the two ends of the carrier circuit connect effectively to the midpoints of the resistor networks connected across the two separate secondary windings of the input transformer. In either case adjustment can be provided for accurately balancing the carrier components.

Figure 2:
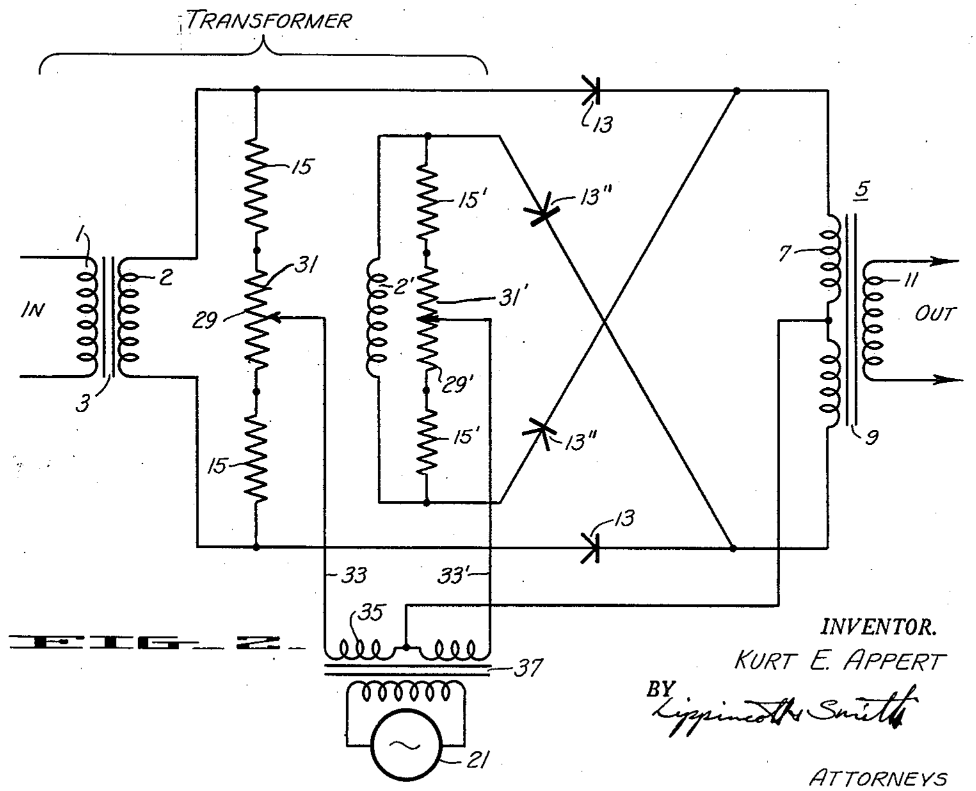

In the accompanying drawings, explanatory of the detailed description to follow, Figure 1 is a circuit diagram illustrating the connections utilized in the embodiment of the invention first above mentioned; and Figure 2 is a similar diagram illustrating the embodiment of the invention second mentioned above.

In the form of the invention illustrated in Figure 1 the nominal input side of the device comprises a transformer having a primary winding 1 and two equal secondary windings designated as 2 and 2', all magnetically coupled as through the core 3. The line marked "in" connects to the terminals of the primary 1, and may carry either a relatively low modulating frequency current, such as a voice frequency telephone current, or a sideband frequency produced by modulating a carrier, which is to be demodulated by the device.

The output side of the circuit is represented by a transformer generally designated by the reference character 5 comprising a center-tapped winding 7 coupled through the core 9 to a single winding 11, which connects to the circuit marked "out" and will carry either the sidebands produced by modulating the carrier with the input frequency or the restored modulating component, depending upon whether the device is used as a modulator or demodulator. The windings of the two transformers are so designed that the impedances of the input and output circuits are equal as viewed from within the device through either of the input transformer windings 2 or 2′ and the complete output transformer primary 7 respectively; i. e., if both of the lines have equal impedances the number of turns in each of the secondaries 2 and 2′ should be equal to the total number of turns of the center-tapped primary 7, the two transformers being otherwise similar.

Each end of the winding 7 is connected to one end of the windings 2 and 2′, the connections being such that, considering only one end of the winding 7, it is connected to ends of the windings 2 and 2′ respectively which are oppositely poled with respect to potentials produced therein by the primary coil 1. Thus the upper end of the coil 7 is connected to the upper end of coil 2 and to the lower end of coil 2′, (it being assumed that the latter two coils are wound in the same direction upon the core 3) and the lower end of the coil 7 is connected to the other ends of the coils 2 and 2′.

In series in the connections to the coil 2 from the winding 7 are rectifiers 13, and in the connections to coil 2′ a similar pair of rectifiers 13′. The rectifiers of each pair are oppositely poled with respect to the carrier potentials.

Bridged across the terminals of the coil 2 is a series pair of resistors 15. In the present case there is shown between these resistors an additional resistance element 17 provided with an adjustable contact 19. This latter arrangement is optional. The major portion of the resistance in the series circuit is comprised within the two resistors 15; the two halves of the resistor 17 may be considered as continuations of the two resistors 15 and the sliding contact as their junction point. The adjustable intermediate resistor is a refinement which is frequently unnecessary. A similar series circuit of resistors, preferably composed of identical elements to that just described and designated by similar reference characters distinguished by accents, is bridged across the winding 2′.

Carrier current from any suitable source 21 is fed into the circuit through leads 23 and 25. Lead 23 is connected to the midpoint of both of the series resistor combinations 15—17 and 15′—17′, i. e., it is connected to the variable contacts 19 and 19′. Lead 25 connects to the center tap of winding 7.

The general operation of this circuit should at once be apparent to those skilled in the art. In the half of the carrier current cycle when lead 23 is positive the rectifiers 13 offer a relatively low resistance, perhaps 100 to 200 ohms, and conduct readily, and most of the potential drop around the carrier current loop occurs in the resistors 15 which preferably have a value of several thousand ohms. Since both of the rectifiers are conducting the carrier current will divide evenly between the two resistors 15 if they are accurately balanced, and this balance can be achieved with great accuracy by adjusting the contact 19. This adjustment can also compensate for any unbalance between the forward resistance of the two rectifiers, and if the two halves of the winding 7 are not equal enough unbalance can be introduced through the adjustment of the contact to make up for the difference between the ampere-turns of the two halves of the coil so that an exact overall balance is achieved with respect to the output circuit. The important point in the arrangement is that each arm of the resistor net is in series with one rectifier and one rectifier only and inequalities between the two rectifiers or the windings of the transformer 5 can therefore be completely compensated. The two ends of the coil 2 being at substantially the same potential an almost equally good balance against the carrier is achieved with respect to the input circuit.

Signal currents from the coil 2 are added algebraically, as far as their instantaneous values are concerned, to the carrier current through the rectifiers. In the case of the signal currents the voltage drops occur primarily across the transformer windings, very little drop taking place across the rectifiers, and accordingly, insofar as the potentials across the rectifiers themselves are concerned, the drop due to the carrier current exceeds that due to the modulating current across the one rectifier of the pair wherein the two drops are subtractive, this being the necessary condition for substantially distortionless modulation. During the same interval, when the lead 23 is positive, rectifiers 13 will be substantially non-conducting to the carrier. Substantially the entire drop between leads 23 and 25 therefore takes place across the rectifiers 13′. In case of the modulating potential from winding 2′, a potential drop also occurs entirely or almost entirely across the two rectifiers 13′. This potential drop is much higher than that across the rectifiers 13, since substantially none of it occurs across the output transformer winding 7. If the carrier voltage drop across the rectifiers 13′ were limited to equality with the drop occurring across rectifiers 13 this drop might be overcome by the modulating voltage, causing conduction to take place and distortion to ensue, but owing to the fact that there is substantially zero drop across the resistors 15′ the carrier voltage rises to meet the occasion and accordingly high level modulation may be maintained. The circuit therefore meets all of the requirements of former circuits using either fixed biases or current-limiting resistors and at the same time permits neutralization of rectifier unbalance without introducing an insertion loss such as is caused by the use of limiting resistors directly in series with the rectifiers and the modulating or signal currents. Some insertion loss is, of course, produced, due to the shunt resistances 15 and 15′ connected across the coils 2 and 2′.

It should be pointed out that it is only in exceptional cases that the final adjustment made on the resistance elements 17 and 17′ by their associated sliding contacts need be made. Fixed resistors, while subject to manufacturing inaccuracies, can be made to much closer tolerances than rectifiers can be, and center-tapped windings such as the winding 7 can be made to a high degree of accuracy, although this does involve expense.

Both the degree of unbalance and the insertion losses will vary with the other constants of the circuits actually employed. To some extent they are interdependent but both can be made materially lower than those in more conventional circuits capable of equally high-level modulation.

Figure 2 shows a modified form of the invention which employs a three-wire carrier circuit instead of the two-wire circuit shown in the first form described. In this case the input and output transformers are identical with those shown in the first figure and are identified by the same reference characters. The rectifier connections are the same with the exception that the two rectifiers connected to coil 2′ are oppositely directed from those shown in the first figure and are therefore designated by the reference characters 13''. The bridging resistor circuits are the same insofar as resistors 15 and 15' are concerned, but the adjustable resistors 29, 29' connect through sliding contacts 31 and 31', to leads 33—33' and thence to opposite ends of the center-tapped winding 35 of a carrier current transformer 37. The latter is supplied by a carrier source 21 which may be of the same character as that used in the first described form of the device. The center taps of windings 35 and 7 are connected together.

One further fact in connection with the circuits should, perhaps, be mentioned. It has already been pointed out that the input and output circuits are conjugate and can be interchanged without any effect upon the operation of the device. In reversing-switch-type modulators of this general character the carrier input circuit is ordinarily conjugate to the other two and can be interchanged with either of them without affecting operation, but that is not true in the present case since connecting the carrier leads to either the input or the output circuits would not only make the resistance network useless as effecting a limitation of the current through the rectifiers but would also add an extremely high insertion loss.

I claim:

A frequency changing circuit comprising a pair of conjugate input-output transformers, one of said transformers having a pair of substantially equal separate windings and a third winding for connection to a line, the other of said transformers having a center-tapped winding and a second winding for connection to a line, a pair of series resistors bridged across each of said equal windings, a pair of connections from one end of said center-tapped winding to one end of each of said separate windings, the connected ends of said separate windings being oppositely poled with respect to said third winding, like connections from the other ends of said center-tapped winding to the opposite ends of said separate windings, a rectifier in each of said connections, the two rectifiers connected to each end of said center-tapped winding being oppositely poled with respect to said center-tapped winding, and a carrier current circuit including a second center-tapped winding, the center taps of both of said center-tapped windings being connected together and the ends of said second center-tapped winding being connected respectively to the junctions between said pairs of series resistors.

KURT E. APPERT.

REFERENCES CITED

The following references are of record in the file of this patent:

UNITED STATES PATENTS

| Number | Name | Date |
|---|---|---|
| 2,462,093 | Grimes | Feb. 22, 1949 |

FOREIGN PATENTS

| Number | Country | Date |
|---|---|---|
| 696,583 | Germany | Aug. 22, 1940 |